US006922832B2

United States Patent
Barnett et al.

(10) Patent No.: US 6,922,832 B2
(45) Date of Patent: Jul. 26, 2005

(54) EXECUTION OF DYNAMIC SERVICES IN A FLEXIBLE ARCHITECTURE FOR E-COMMERCE

(75) Inventors: Janet A. Barnett, Pattersonville, NY (US); John A. Interrante, Schenectady, NY (US); Osmon R. Oksoy, Clifton Park, NY (US); Jesse N. Schecter, Niskayuna, NY (US); Bassel O. Williams, Albany, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 794 days.

(21) Appl. No.: 09/735,060

(22) Filed: Dec. 12, 2000

(65) Prior Publication Data
US 2002/0073134 A1 Jun. 13, 2002

(51) Int. Cl.[7] .............................. G05F 9/46; G05F 9/455
(52) U.S. Cl. ........................... 718/1; 718/100; 718/102; 718/105
(58) Field of Search ......................... 718/100, 104–106, 718/1; 709/217–219, 223–226, 105, 100, 104, 106

(56) References Cited

U.S. PATENT DOCUMENTS

| | | | |
|---|---|---|---|
| 5,930,511 A | | 7/1999 | Hinsley |
| 5,991,808 A | | 11/1999 | Broder et al. |
| 6,026,425 A | | 2/2000 | Suguri et al. |
| 6,128,279 A | * | 10/2000 | O'Neil et al. ................ 370/229 |
| 6,389,448 B1 | * | 5/2002 | Primak et al. .............. 718/105 |
| 6,393,458 B1 | * | 5/2002 | Gigliotti et al. ............. 709/203 |
| 6,446,070 B1 | * | 9/2002 | Arnold et al. ................ 707/10 |
| 6,542,933 B1 | * | 4/2003 | Durst et al. ................. 709/229 |

OTHER PUBLICATIONS

Jini Network Technology, "Jini[tm] Technology Architectural Overview" (Jan. 1999).

* cited by examiner

Primary Examiner—Meng-Al T. An
Assistant Examiner—Syed J Ali
(74) Attorney, Agent, or Firm—Scully, Scott, Murphy & Presser

(57) ABSTRACT

A system for distributing services for execution by dynamically available resources is disclosed. A computational load of a service for execution is distributed among the dynamically available resources such that no resource is under or over utilized. The system includes an Execution Server, arranged to communicate with at least one user browser, including an Execution Manager servlet, a Results Manager servlet, and a Results Finder servlet. The system further includes a Load Balancer Lookup Finder object for finding and identifying an available Load Balancer to the Execution Manager at least one Load Balancer, at least one Compute Server and a Compute Server Lookup Finder object in communication with the Load Balancer to find and effectively utilize the available Compute Servers for executing the user services.

8 Claims, 2 Drawing Sheets

EXECUTION OF DYNAMIC SERVICES IN A FLEXIBLE ARCHITECTURE FOR E-COMMERCE

RELATED APPLICATIONS

Figure 1:
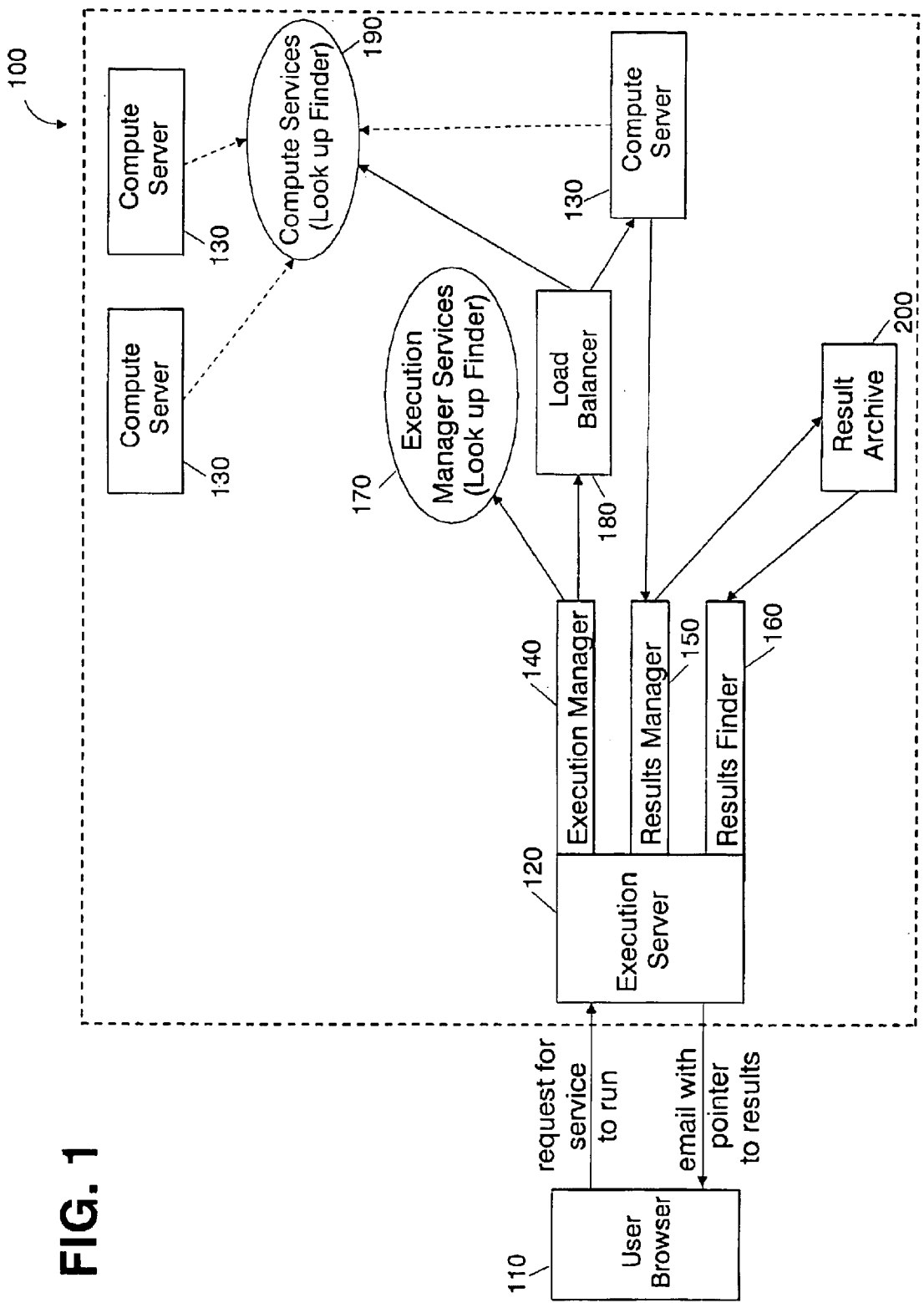

This application is related to co-pending U.S. patent application Ser. No. 09/735,058 filed concurrently herewith entitled NETWORK DYNAMIC SERVICE AVAILABILITY by the same inventors as the present application and assigned to the same assignee as the present application, the entirety of which is hereby incorporated by reference.

BACKGROUND OF THE INVENTION

The present invention relates to the distribution and execution of computationally intensive services over a plurality of networked computer systems. More particularly, the invention relates to a system which dynamically registers network resources, and tracks their availability to execute a requested service (job) by evenly distributing (balancing) the job's load for execution across available networked resources.

Computationally intensive services have traditionally been executed on mainframe systems. Some systems have recently been developed that allow for distributing the load of computationally intensive jobs (services) over many networked computer systems. As a result, conventional distributed computing systems, such as banks or networks of workstations, servers or mirrored sites ("hosts") on the World Wide Web (WWW) must address the problem of using their distributed system resources effectively. For example, in conventional systems where some hosts (system resources or servers) lie idle while others are heavily loaded, system performance can decrease significantly. To prevent such unbalanced and inefficient performance and use of system resources, attempts have been made to distribute a service-execution load throughout the conventional distributed computer system's networked resources.

However, distributing a load for execution across networked resources can raise load balancing issues. Load balancing includes distributing processing and communication activity evenly across a computer network so that no single device is overused. Load balancing may improve performance measures such as the expected time a task stays in the system.

For example, very few enterprises can afford to host their company's web site on a single, monolithic server. Rather, sites are deployed on server clusters that improve performance and scalability. To provide fault tolerance and hide cluster detail from site visitors, a load balancing appliance sits between the INTERNET and the server cluster, acting as a virtual server.

As each new client request arrives, the load balancing appliance makes near instantaneous intelligent decisions about the physical server best able to satisfy each incoming request. Load balancing optimizes request distribution based on factors like capacity, availability, response time, current load, historical performance and administrative weights. A well-tuned adaptive load balancer ensures that customer sites are available 24×7 with the best possible response time and resource utilization.

Although determining an effective load balancing strategy depends largely on the details of the underlying system, general models from both queuing theory and computer science often provide valuable insight and general rules of thumb. For example, in a system comprising N servers, incoming tasks must be assigned a server and wait for service. Logic would have it that if an incoming task knows exactly the current number of tasks already queued at each server, then the task can be instantaneously queued. It is usually best for the task to be routed to the server with the shortest queue if the tasks are of about equal size. However, there are many different algorithms for Load Balancing. In many actual systems, however, it is unrealistic to assume that tasks will have access to up-to-date load information. While global information may be updated only periodically, the time delay for a task to be moved to a server may still be so long that the load information is out of date by the time the task arrives.

Other than operation within conventional systems in which up-to-date load information is available, the strategy of going to the shortest queue can lead to disastrous results when load information is out of date by the time the task arrives. Consequently, certain resources may be over utilized while others are under utilized. But even in conventional systems where load balancing issues are addressed, computational resources are not dynamically available. Hence, some means of handling variable (dynamic) availability of resources, such as computational resources, is needed to render the execution system much more scalable and robust.

To that end, U.S. Pat. No. 5,991,808, provides a system for servicing a job, such as by use of a plurality of processing units or hosts. In a multiprocessor system, the processing units could all be part of a single computer device, such as a high power work station with multiple processors. Alternatively each of the processing units could be a single computer, when linked together form a bank or network of servers or workstations each of which include a single processor.

A task directing unit, which may be a client processor in a distributed computing environment such as a network, the Web or part of a multiprocessor computer device itself, is interconnectable to each of the plurality of system resources. The task directing unit is configured to first obtain load information representing a loading of each of a number of resources selected uniformly at random (u.a.r.). Preferably, the task directing unit simultaneously queries each of the randomly selected resources for load information. Each randomly selected resource is configured to respond to the query with load information representing its loading.

While the '808 patent addresses load balancing issues in this manner, it does not address dynamic availability of computational resources. As stated, during system operation, the task directing unit must query each known resource for its scheduling. That is, new resources are not dynamically available to facilitate expeditious and balanced distribution of tasks over available system resources.

THE OBJECTS AND SUMMARY OF THE INVENTION

It is therefore an object of this invention to provide a system which dynamically accepts and registers new resources for execution therein which overcomes the shortcomings of the prior art.

It is another object of the invention to provide a system which dynamically accepts and registers new resources (or removes existing resources), and distributes a processing load of computationally intensive user-requested services across the dynamically available system resources, whether "new" or previously registered.

It is another object of this invention to provide a system which will balance the distribution of a computationally intensive load across all dynamically available system resources (servers) such that none of the dynamically available system resources are under or over utilized.

It is another object of the invention to provide a system in which system resources are dynamically found and made available such that the system need not be stopped or reconfigured to make use of the new resources.

To that end, an inventive system is disclosed herein which dynamically accepts and registers new resources, and distributes a service to be executed by the system across all dynamically available networked resources. That is, the system will balance the service load distribution for execution across all presently available system resources. A key aspect of the invention is its ability to dynamically find new resources and services and register them within the system immediately upon their availability. An obvious benefit to dynamic availability of system resources is that the system does not need to be stopped or reconfigured for it to make use of a "new" resource immediately upon registration of the new resource in a system registry.

To that end, an Execution Manager, Load Balancer and Compute Server are system software components which implement the unique processing and resource tracking ability of the system of this invention. The Execution Manager is located on an Execution Server to which each system user must interface in order to have a service executed. During operation, the Execution Manager waits for jobs, e.g., computationally intensive algorithms, to be submitted to it from a user. The reader should note that these jobs could be submitted directly by the user to a server, or could be services purchased by a user through a browser, etc.

Upon receipt of the job, the Execution Manager checks Execution Manager Services which dynamically maintains a registry of all Load Balancers presently available. Each Load Balancer manages one or more Compute Servers. Each Compute Server object represents a networked device that is capable of executing a job or some portion thereof.

The first Load Balancer found by the Execution Manager Services receives the request for service and then searches for all Compute Servers presently (dynamically) available to execute the service identified in a Compute Services. The Compute Services dynamically maintains a registry of all Compute Servers available to the Load Balancer, and thereafter distributes and executes the service so that no single Compute Server is over or under utilized.

The fact that the system dynamically finds Load Balancers and Compute Servers each time a service requires execution ensures that the system will be aware of new Load Balancers and new Compute Servers immediately upon availability. The dynamic nature of the inventive system also ensures that the system will not try to use a resource that is no longer available; the Compute Server for that discontinued service simply won't be found.

BRIEF DESCRIPTION OF THE DRAWING FIGURES

Figure 2:
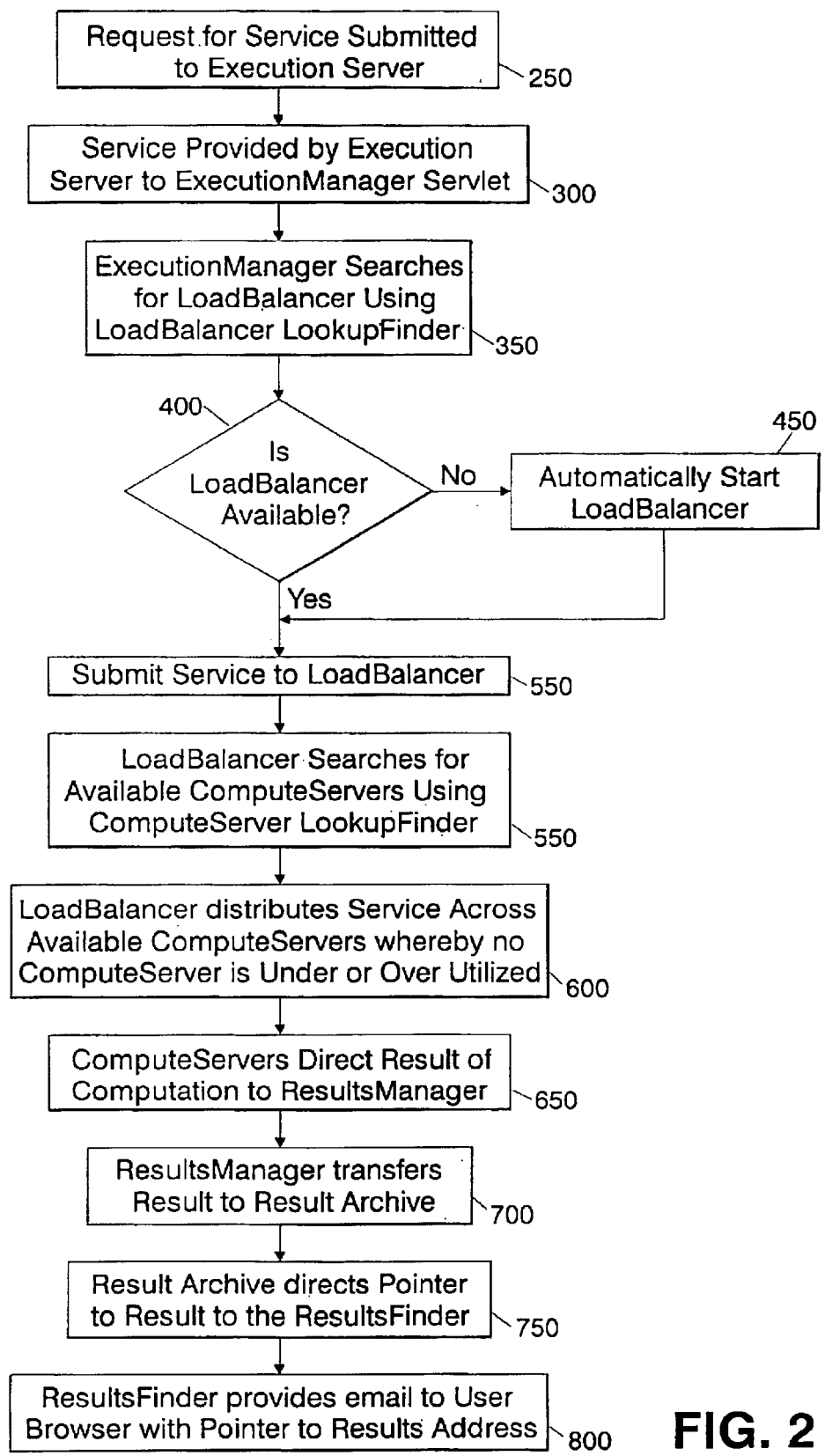

FIG. 1 is a schematic block diagram of a preferred embodiment of the system of this invention; and FIG. 2 is a flow diagrams which together depict an embodiment of a method for implementing a process of the present invention.

DETAILED DESCRIPTION OF THE PREFERRED EMBODIMENTS

A first embodiment of a system 100 of the present invention is depicted in FIG. 1. A user browser 110 is shown in communication with an Execution Server 120 of system 100. Execution Server 120 provides the mechanism for all user services to run, particularly compute intensive jobs distributed across various Compute Servers within the system. Compute Servers run on a specific machine and make themselves available to run executable objects by registering with Lookup Servers. Compute Servers are expected to keep statistics about their own history of running Executables. These statistics may be used by the Load Balancer. The Execution Server 120 includes an Execution Manager servlet 140, a Results Manager servlet 150 and a Results Finder servlet 160. The Results Finder servlet 160 is included for executing and storing the results of computationally intensive jobs. The Execution Manager 140 also serves as the means of processing all services via Compute Servers.

The Execution Manager 140 is a servlet that allows a constant point of entry for the client applet. The Execution Manager 140 listens for communications from the user browser 110 in a form of a client applet supplied to it by the user browser. When a connection is made, the Execution Manager 140 tries to read an Executable object from the client applet using the object input stream. If there is an error reading the Executable, an error message is returned to the user via the client applet. When the Execution Manager 140 has read a valid Executable, it attempts to pass the job to a Load Balancer 180, submitting the job to the first one found. The Execution Manager 140 could also determine which Load Balancer to use algorithmically, if needed Execution Manager 140 utilizes a Lookup Finder object of Execution Manager Services 170 to find the first available Load Balancer 180. The Lookup Finder object is a helper class that encapsulates the commands necessary to find Lookup Servers. Load Balancer objects discover all available Compute Servers at a specific point in time and use one of several criteria to select the most eligible Compute Server to run a specific job. Only one Compute Server need be running at a time unless the system is overloaded. The Load Balancer 180 in turn utilizes a Lookup Finder object of Compute Services 190 to find the Compute Servers 130 immediately accessible by the Load Balancer 180. Each Load Balancer 180 has a Computer Services 190 for managing one or more computer servers available to it, but for clarity these elements are only depicted for one Load Balancer in FIG. 1. Load Balancer 180 determines, based on known Compute Server 130 availability, how and which Compute Servers to distribute the job over so that none of the Compute Servers 130 are under or over utilized. Load Balancer 180 accesses the Lookup Finder of Compute Services 190 to identify all Compute Servers 130 immediately available to the Load Balancer.

The Load Balancer 180 then passes the job to the most eligible Compute Servers 130 based on the total amount of time each Compute Server has spent on jobs, or based on the last time each Compute Server 130 completed a job. These are configurable options and criteria for selecting a Compute Server 130 could easily be implemented and added to the system 100 by amending the Lookup Finder object for the Compute Services 190. If no Load Balancer 180 is available through Execution Manager Services 170, the Execution Manager 140 returns a diagnostic message to the user browser 110 via a client applet. Otherwise, the Execution Manager 140 invokes the Load Balancer's run job method with the Executable as a parameter. If the run job is successful, execution passes to the Results Manager 150 which is given a unique job I.D. The same job I.D. is returned to the user browser 110 via the client applet with the Executable for identification purposes.

Information about the owner of the Executable is stored using a result object provided by the Results Manager 150 to a Results Archive 200. The Results Manager 150 is a Java servlet that takes a Result object from a Compute Server after a job has been completed and prints the results in a unique file in the results area. The information may be interchangeably referred to herein as a "Result". That is, the Results Manager servlet 150 combines the Result with the job ID to create a unique path to the Result (URL). The URL of the Result is sent first to the Results Finder servlet 160, where it is further transferred to the User Browser 110 by e-mail from the Results Finder servlet 160 via the Execution Server 120.

The Compute Server runs the Executable by invoking its runMe method, which will return a Results object. Once the Compute Server has updated its own statistics, such as time running and jobs completed, it passes the Results to the Results Manager 150, as described above.

FIG. 2 depicts a method of the present invention whereby user services for execution are distributed among a number of Compute Servers 130, the execution Result is stored and the user is informed by email of the location of the Result. In particular, block 250 of FIG. 2 represents a step where a user's request for service is submitted to the Execution Server 120. Block 300 represents a step where the user service for execution is provided by the Execution Server 120 to the Execution Manager servlet 140. Block 350 represents a step by which the Execution Manager searches the Execution Manager Services 170 for a Load Balancer 180.

Block 400 represents a step where the Load Execution Manager Services 170 either finds an available Load Balancer 180, or, if not, passes the process flow to block 450 where a Load Balancer may be automatically (or manually) started. Block 500 depicts a step where the Execution Manager submits the service for execution to the Load Balancer. The Load Balancer 180 thereafter searches for available Compute Servers capable of executing the service using the Compute Server Lookup Finder of Compute Services 190. Block 600 depicts a step where the Load Balancer distributes the service load across the Compute Servers available or registered with it per its query of the Compute Services 190 such that no Compute Server is under or over utilized.

Block 650 depicts a step where the Compute Servers 130 complete the processing and direct the Result to the Results Manager servlet 150. Block 700 depicts a step where the Results Manager servlet transfers the Result to the Result Archive 200. Block 750 represents a step where the Result Archive directs a pointer to the Result to the Results Finder servlet 160. Block 800 represents a step where the Results Finder servlet 160 provides the pointer to the Result stored in the Results archive 200 to the user or service requester 110.

It should be noted that while not apparent from the drawing figures, all Compute Servers and Load Balancers are automatically (dynamically) registered or deleted from the respective Load Balancer Execution Manager Servers 170 and Compute Server Compute Services 190. The dynamic update process registers and deletes ComputerServers and Load Balancers. The Execution Manager dynamically finds Load Balancers (by contacting any Lookup servers on the network and requesting information about Load Balancers). The Load Balancers, in turn, perform the same type of dynamic location of Compute Servers. When a new Load Balancer or ComputerServer is started on the network, they will register themselves with a Lookup Server; when the Execution Manager needs to locate Load Balancers or when a Load Balancer needs to find Compute Servers, they both contact the Lookup Server which informs them of the new services.

All computational resources in the system are registered with the Lookup Server on a leased basis (a lease can be created for any time interval, from seconds to infinity), and the system automatically monitors each resource. If a ComputerServer vanishes from the network (for example, a computer loses power and becomes inoperative), the lease with the LookupServer will expire, and the defunct Compute Server will vanish from the Lookup Server's registry preventing access.

The dynamic resource process can be more specifically described as follows. All Computational services register with Lookup Servers (LookupServers are analogous to registries). If, for example, the Execution Manager needs to locate Load Balancers, it first "discovers" all Lookup Servers(LUS) on the network. It does this by using multicast IP and will obtain a response from all LUSs on the network. Once the Execution Manager knows where these LUSs are, it can contact as many of them as it chooses and request information on any type of services needed; in this case, it would request information on Load Balancers. The LUSs respond with a proxy for each registered entity that matches the request (in our case, they respond with a proxy for every registered Load Balancer). Once the Execution Manager has the proxy, it is used to access the Load Balancer services directly.

The system's ability to dynamically register/delete available Load Balancers and Compute Servers, and to distribute a service load over a number of available Compute Servers for balanced load execution, enables it to overcome the limitations of conventional distributed computational systems.

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

What is claimed is:

1. A system for receiving and distributing user services for execution by any of a plurality of dynamically available resources registered by the system whereby a computational load of each of said services is distributed for execution among said dynamically available resources, the system comprising:

an Execution Server arranged to communicate with at least one user browser, the Execution Server including an Execution Manager servlet, and a Results Manager servlet;

a first Lookup Finder object for Load Balancers communicating an availability of Load Balancers to said Execution Manager servlet;

at least one Load Balancer in communication with the Execution Manager servlet and the Lookup Finder object for Load Balancers;

at least one Compute Server in communication with at least one Load Balancer and the Results Manager servlet; and a second Lookup Finder object for Compute Servers in communication with the at least one Load Balancer and the at least one Compute Server;

whereby the Execution Manager servlet waits for services to be submitted to it by the at least one user browser through the Execution Server, wherein the Execution Manager searches for dynamically available Load Balancers using the first Lookup Finder object for Load Balancers and submits computationally intensive services to the Load Balancer found, and wherein said first Load Balancer searches for available Compute Servers using the second Lookup Finder object for Compute Servers to distribute the user services for execution, such that the available Compute Servers return a result to the Results Manager servlet.

2. The system defined by claim 1, further including means for dynamically finding Load Balancers and Compute Servers each time a system service requires execution.

3. The system defined by claim 1, wherein a Compute Server Result is provided to the Results Manager servlet for storage in a Result Archive.

4. The system defined by claim 3, wherein the Result Archive is in communication with a Results Finder servlet which provides a URL of a Result to the user browser via the Execution Server.

5. A method for executing a user service within a system by distributing a load of the service across dynamically available resources of the system, the system comprising an Execution Server, an Execution Manager servlet, a Results Manager servlet, a Load Balancer Lookup Finder object, at least one Load Balancer, a Compute Server Lookup Finder object and at least one Compute Server, wherein the method comprises:

receiving a user request for execution of a service at the Execution Server;

providing the service to the Execution Manager servlet for execution;

searching by the Execution Manager servlet for the at least one Load Balancer using the Load Balancer Lookup Finder object to define service load execution by the at least one Compute Server;

submitting the service to a first Load Balancer found;

searching by the first Load Balancer for Compute Servers which are available and capable of executing some portion of the service using the Compute Server Lookup Finder object; and distributing the service load for execution across the available Compute Servers such that each available Compute Server is utilized in realizing a Result and returning the Result to the Results Manager servlet.

6. The method of claim 5 further including the steps of:

directing the Result to a Results Manager servlet;

transferring the Result from the Results Manager servlet to a Result Archive;

directing a pointer to the Result to a Results Finder servlet; and transferring the pointer to the Result stored in the Results Archive to the user.

7. A computer readable medium having computer readable program code means embodied therein for executing a user service within a system by distributing a load of the service across dynamically available resources of the system, the system comprising an Execution Server, an Execution Manager servlet, a Results Manager servlet, a Load Balancer Lookup Finder object, at least one Load Balancer, a Compute Server Lookup Finder object and at least one Compute Server, the computer readable program code means comprising:

computer readable computer code means for receiving a user request for execution of a service at the Execution Server;

computer readable computer code means for providing the service to the Execution Manager servlet for execution;

computer readable computer code means for searching for the at least one Load Balancer using the Load Balancer Lookup Finder object;

computer readable computer code means for submitting the service to the first Load Balancer found;

computer readable computer code means for searching by the at least one Load Balancer using the Compute Server Lookup Finder object for available Compute Servers capable of executing the service; and computer readable computer code means for distributing the service load across available Compute Servers for execution such that each available Compute Server is utilized in realizing a result and returning the result to the Results Manager servlet.

8. The computer readable medium of claim 7 further including computer readable computer code means for directing the Result of execution to a Results Manager servlet;

computer readable computer code means for transferring the Result from the Results Manager servlet to a Result Archive;

computer readable computer code means for directing a pointer to the Result in the Result archive to a Results Finder servlet; and computer readable computer code means for transferring the pointer to the Result stored in the Results Archive to the user.

* * * * *